T. F. DOWNEY.
FILE AND RASP CUTTING TOOL.
APPLICATION FILED MAY 2, 1916.

1,221,845.

Patented Apr. 10, 1917.

WITNESS: Wm. Bell

INVENTOR,
Thomas F. Downey
BY John Steward,
ATTORNEY.

UNITED STATES PATENT OFFICE.

THOMAS F. DOWNEY, OF PATERSON, NEW JERSEY.

FILE AND RASP CUTTING TOOL.

1,221,845. Specification of Letters Patent. Patented Apr. 10, 1917.

Application filed May 2, 1916. Serial No. 94,888.

*To all whom it may concern:*

Be it known that I, THOMAS F. DOWNEY, a citizen of the United States, residing at Paterson, in the county of Passaic and State of New Jersey, have invented certain new and useful Improvements in File and Rasp Cutting Tools, of which the following is a specification.

The usual file or rasp cutting machine includes a blank supporting anvil adapted to rock in a suitable bearing and provided with a handle for shifting it, and a presser for holding the blank against the anvil as it is advanced with reference to the rapidly vibrated cutter. The anvil is manually shifted on an axis substantially parallel with the blank so as to elevate one side of the other thereof when it appears that the cuts are not extending uniformly or clear across the same, due to variations in thickness or bends in the blank. Because the cutting operation proceeds very rapidly it frequently happens that before the operator is aware of it and corrects the position of the blank so that its face will be squarely presented to the tool a lateral slope, one way or the other, is presented, so that the cuts are not uniform or clear across the blank; this makes the finished file or rasp more or less imperfect and in addition it causes frequent breakage of the cutting blade, one corner or the other breaking away because the shock is not distributed equally across the edge of the blade, and in consequence of this the machine must be frequently stopped for the changing of the cutting blades.

My object is to provide a chisel in which the cutter is capable of rocking in its own plane so as to adjust itself to inequalities in the face of the blank, the cutter and stock to that end being provided with abutting surfaces affording a rocking back-thrust bearing for the cutter against the stock. In the preferred construction, the cutter includes a blade or a cutter proper and a gib, the blade being held in the stock by a screw so as to move pivotally in its own plane, and the gib and stock (or it may be a bearing piece for the gib forming a removable part of the stock) have abutting surfaces one of which is curved, and the gib is shiftable in the plane of the blade.

In the accompanying drawings.

Figure 1:
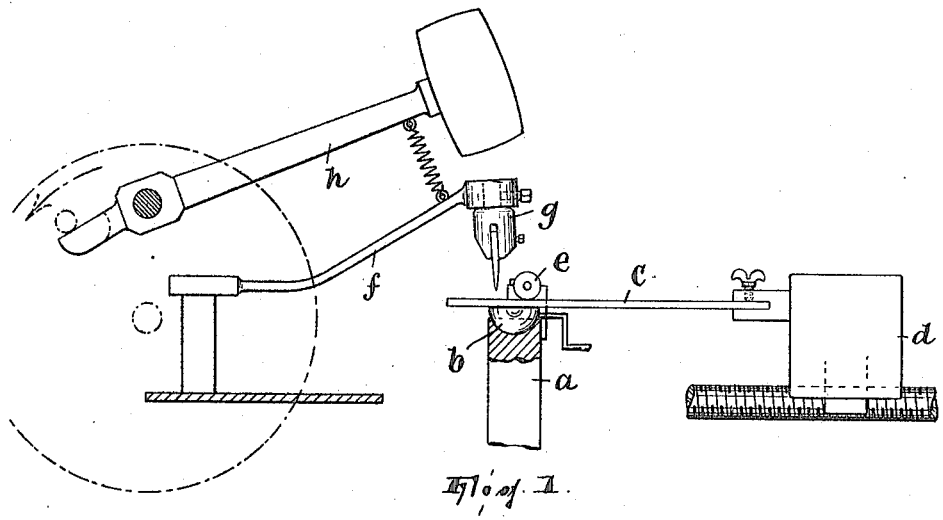
Figure 1 shows enough of a file or rasp cutting machine to illustrate the present invention, the chisel illustrated being constructed in accordance with my invention.

In Fig. 1, $a$ is a suitable support for the hemispherical anvil $b$ which is adapted to be shifted manually in its bearings in the support $a$ so as to face the blank $c$ to be cut, resting thereon, properly with respect to the chisel, and $d$ is a suitable means for feeding the blank lengthwise over the anvil, $e$ being a presser to hold the blank against the anvil. $f$ is a spring-arm which carries the stock of the chisel $g$ and $h$ is a rapidly vibrated hammer adapted to strike the arm $f$ and thereby impart cutting blows to the chisel.

The stock $i$ of the chisel is provided with a slit $j$ to receive the cutter, and with a set screw $k$ which is tapped into the stock perpendicularly to the slit $j$ in the usual way for holding the cutter.

Figures 2, 3, 4:
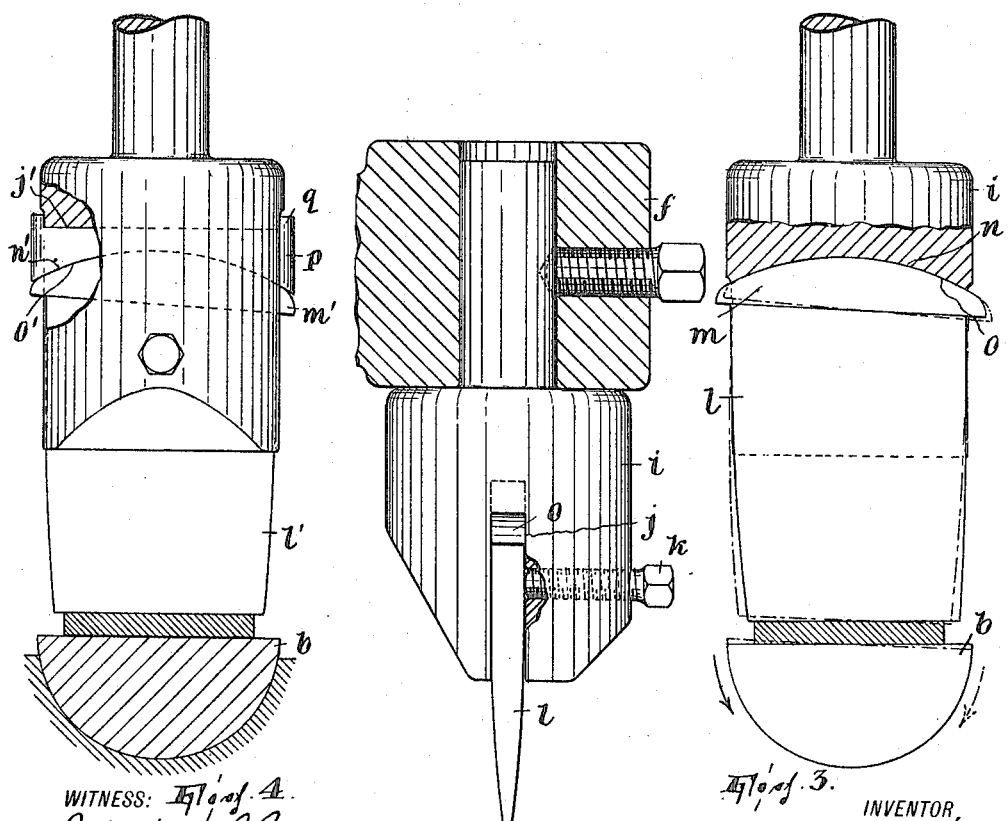
Fig. 2 is a side elevation, partly in section, of the chisel.
Fig. 3 shows the chisel in front elevation, the front portion of the stock being broken away and the cutter being shown resting upon the blank supported by the anvil; and, Fig. 4 shows a front elevation, partly broken away, of a modification of the invention, the anvil and blank appearing in section.

In Figs. 2 and 3 the cutter is shown as consisting of a blade $l$ and a gib $m$ arranged in the same plane as the blade and having approximately the same thickness. The inner end of the slit forms a face $n$ to abut the face $o$ of the cutter (in the present instance, of the gib of the cutter), these faces when abutting resisting the back thrust of the cutter in the stock. One of them is curved (as shown both of them are), the curvature being transverse of the blade and preferably an arc struck from a center in the longitudinal axis of the blade, and having its concave side toward the cutting end of the chisel.

When the chisel is thus constructed, it will be seen that the cutter can adjust itself in the stock to inequalities in the surface of the blank, tilting one way or the other (see dotted lines in Fig. 2) to suit itself to the angle of the plane of the particular part of the blank which is struck. The shifting action will be facilitated if both surfaces $n$, $o$ are curved to the same radius and kept well lubricated.

By securing the blade in the stock by a member, as $k$, which bears thrustwise against one face thereof, and forming the curve so that its concave side is toward the cutting end of the implement, the blade is shiftable on an axis extending through it in such manner as to remain centralized with reference to the thrust-line of the implement.

Fig. 4 shows a modification in which my invention is applicable to a stock without changing the same. The blade and gib $l'$ and $m'$ remain the same as in Figs. 2 and 3, but the curved surface $n'$ which abuts the curved surface $o'$ of the gib is afforded by the bearing piece $p$ which rests against the inner end of the slit $j'$ and has upstanding lugs $q$ to engage each side of the stock and hold the bearing piece against lateral movement in its own plane.

The gib is useful in obtaining fine initial adjustments. Having set the screw $k$, the blade may be adjusted by tapping the gib with a hammer to a much finer degree than could be effected by tapping the blade itself.

By my invention, the necessity for shifting the anvil $b$ is in a large measure if not wholly eliminated, the cutter automatically adjusting itself to the plane of the face of the material being operated upon.

Having thus fully described my invention, what I claim as new and desire to secure by Letters Patent is:—

1. A chisel for a file or rasp cutting machine consisting, in combination, of a stock member, a cutter member freely movable pivotally in its own plane in the stock member, said members having in the plane of the cutter member abutting surfaces resisting the back thrust of the cutter member in the stock member and one of said surfaces following a curve whose concave side is toward the cutting end of the chisel, and a threaded device for holding the cutter member arranged in the stock member and bearing thrustwise against one face of the cutter member.

2. A chisel for a file or rasp cutting machine consisting, in combination, of a stock member and a cutter member freely movable pivotally in its own plane in the stock member and including a blade member and a gib member, the gib member being arranged between the blade member and stock member and having its upper and lower faces contacting with opposite faces of the stock and blade members, one of the faces named being curved transversely of the blade member, and said gib being shiftable laterally in the plane of the blade member independently of the same and the stock member.

In testimony whereof I affix my signature.

THOS. F. DOWNEY.

Copies of this patent may be obtained for five cents each, by addressing the "Commissioner of Patents, Washington, D. C."